US012119194B2

(12) United States Patent
Sasama et al.

(10) Patent No.: US 12,119,194 B2
(45) Date of Patent: Oct. 15, 2024

(54) FUSE AND METHOD FOR MANUFACTURING FUSE

(71) Applicant: Pacific Engineering Corporation, Gifu (JP)

(72) Inventors: Takayuki Sasama, Gifu (JP); Shigeki Yabashi, Gifu (JP)

(73) Assignee: Pacific Engineering Corporation, Gifu (JP)

( * ) Notice: Subject to any disclaimer, the term of this patent is extended or adjusted under 35 U.S.C. 154(b) by 194 days.

(21) Appl. No.: 17/792,964

(22) PCT Filed: Dec. 10, 2020

(86) PCT No.: PCT/JP2020/045998
§ 371 (c)(1),
(2) Date: Jul. 14, 2022

(87) PCT Pub. No.: WO2021/166387
PCT Pub. Date: Aug. 26, 2021

(65) Prior Publication Data
US 2023/0051371 A1 Feb. 16, 2023

(30) Foreign Application Priority Data
Feb. 19, 2020 (JP) ................................ 2020-025798

(51) Int. Cl.
*H01H 69/02* (2006.01)
*H01H 85/12* (2006.01)

(52) U.S. Cl.
CPC ............ *H01H 69/02* (2013.01); *H01H 85/12* (2013.01); *H01H 2231/026* (2013.01)

(58) Field of Classification Search
CPC .............................. H01H 69/02; H01H 85/12
See application file for complete search history.

(56) References Cited

U.S. PATENT DOCUMENTS 5,055,817 A 10/1991 O'Shields et al.
10,325,745 B2 * 6/2019 Lasini .................... H01H 85/10
(Continued)

FOREIGN PATENT DOCUMENTS

JP 2017004634 A * 1/2017

OTHER PUBLICATIONS

Ando Mitsuru; Paudel Rishab, "Fuse Element and Built-in Fuse Element", Jan. 5, 2017, Taiheiyo Seiko KK, Entire Document (Translation of JP 2017004634). (Year: 2017).*
(Continued)

*Primary Examiner* — Stephen S Sul
(74) *Attorney, Agent, or Firm* — Lowe Graham Jones PLLC

(57) ABSTRACT

Provided are a fuse having a structure that facilitates bending of a fuse element, and a method for manufacturing the fuse. In a fuse including a fuse element having a pair of terminal portions, a middle portion provided between the terminal portions, and a fusing portion provided in the middle portion, at least two or more of the middle portions are provided in the terminal portion, at least one of the middle portions is bent along a long direction such that a center side protrudes from long sides on both sides, and the middle portions are disposed to face each other when the terminal portion is folded at a bending point K2 of the terminal portion.

8 Claims, 4 Drawing Sheets

(56) References Cited

U.S. PATENT DOCUMENTS

| | | | | |
|---|---|---|---|---|
| 11,075,047 | B2 * | 7/2021 | Douglass | H01H 69/02 |
| 2015/0002258 | A1 * | 1/2015 | Yoshida | H01H 85/38 337/273 |
| 2015/0371803 | A1 * | 12/2015 | Hosomizo | H01H 85/12 337/142 |
| 2018/0122606 | A1 * | 5/2018 | Ando | H01H 85/143 |
| 2019/0096622 | A1 | 3/2019 | Lasini et al. | |
| 2020/0227225 | A1 * | 7/2020 | Yokomizo | H01H 85/08 |

OTHER PUBLICATIONS

International Search Report (with English translation) and Written Opinion of the International Searching Authority in International Patent Application No. PCT/JP20/45998, dated Feb. 22, 2021, 8 pages.

* cited by examiner

FUSE AND METHOD FOR MANUFACTURING FUSE

PRIORITY CLAIM

This application is a U.S. national phase of International Patent Application No. PCT/JP2020/045998, filed Dec. 10, 2020, which claims the benefit of priority from Japan Patent Application No. 2020-025798 filed Feb. 19, 2020, the contents of which are incorporated by reference.

FIELD OF THE INVENTION

The invention of the present application relates to a fuse to be used mainly for, for example, an electric circuit for an automobile, and a method for manufacturing the fuse.

BACKGROUND OF THE INVENTION

Conventionally, a fuse has been used to protect an electric circuit mounted on an automobile or the like and various electrical components connected to the electric circuit. Specifically, when an unintended overcurrent flows in the electric circuit, a fusing portion of a fuse element built in the fuse melts due to heat generated by the overcurrent, thereby protecting the various electrical components by preventing excess current from flowing.

Further, there are various types of such fuses depending on the application, and for example, a fuse described in Patent Literature 1 including a plurality of fusing portions is known.

The fuse described in Patent Literature 1 is of a type in which a fuse element is housed inside a casing, and includes the fuse element having a pair of terminal portions, two or more middle portions provided between the terminal portions, and fusing portions formed in each of the middle portions. Further, in such a fuse element, a single metal plate is punched to form the terminal portions, the two or more middle portions, and the fusing portions formed in each of the middle portions. Thereafter, the terminal portions are bent at bending points of the terminal portions such that the middle portions are disposed to face each other. However, the middle portion is formed in an elongated shape in order to provide the fusing portion, and thus, is easily bent and has lower strength than the terminal portion. Therefore, there is a possibility that the middle portion including the fusing portion is deformed at the time of bending formation of the fuse element as described above, so that the bending formation of the fuse element becomes difficult.

CITATIONS LIST

Patent Literature

Patent Literature 1: Japanese Patent Application No. 2019-224287

SUMMARY OF THE INVENTION

Technical Problems

Therefore, the invention of the present disclosure provides a fuse having a structure that facilitates bending formation of a fuse element, and a method for manufacturing the fuse.

Solutions to Problems

In order to solve the above problems, a fuse according to the invention of the present application is a fuse including a fuse element having a pair of terminal portions, a middle portion provided between the terminal portions, and a fusing portion provided in the middle portion, and is characterized in that at least two or more of the middle portions are provided in the terminal portion, at least one of the middle portions is bent along a long direction such that a center side protrudes from long sides on both sides, and the middle portions are disposed to face each other when the terminal portion is folded at a bending point of the terminal portion.

According to the above characteristic, a structure in which the middle portion is bent along the long direction such that the center side protrudes from the long sides on both the sides is provided. Thus, the strength of the middle portion in the long direction increases and the middle portion can be prevented from being bent and deformed so that bending formation of the fuse element becomes easy.

Furthermore, the fuse according to the invention of the present application is characterized in that the middle portions facing each other are bent so as to be separated from each other outward.

According to the above characteristic, the fusing portions of the middle portions facing each other can be separated from each other, and thus, the fusing portions are less likely to be thermally affected by each other and more easily exhibit desired fusing properties.

Furthermore, the fuse according to the invention of the present application is characterized in that a connection part between the middle portion and the terminal portion is folded in a direction orthogonal to the long direction of the middle portion such that the middle portions facing each other are separated from each other outward.

According to the above characteristic, the fusing portions of the middle portions facing each other can be separated from each other, and thus, the fusing portions are less likely to be thermally affected by each other and more easily exhibit desired fusing properties.

Further, according to a method for manufacturing a fuse of the invention of the present application, provided is a method for manufacturing a fuse including a fuse element having a pair of terminal portions, a middle portion provided between the terminal portions, and a fusing portion provided in the middle portion, the method being characterized by including: punching a single metal plate to form the pair of terminal portions and at least two or more of the middle portions between the terminal portions; bending the middle portion along a long direction such that a center side protrudes from long sides on both sides; and folding the terminal portion at a bending point of the terminal portion to dispose the middle portions so as to face each other.

According to the above characteristic, the middle portion is bent along the long direction such that the center side protrudes from the long sides on both the sides is provided. Thus, the strength of the middle portion in the long direction increases and the middle portion can be prevented from being bent and deformed so that the bending formation of the fuse element becomes easy.

Furthermore, according to the method for manufacturing a fuse of the invention of the present application, the middle portions facing each other are characterized by being bent so as to be separated from each other outward.

According to the above characteristic, the fusing portions of the middle portions facing each other can be separated from each other, and thus, the fusing portions are less likely to be thermally affected by each other and more easily exhibit desired fusing properties.

Furthermore, according to the method for manufacturing a fuse of the invention of the present application, a connection part between the middle portion and the terminal portion is characterized by being folded in a direction orthogonal to the long direction of the middle portion such that the middle portions facing each other are separated from each other outward.

According to the above characteristic, the fusing portions of the middle portions facing each other can be separated from each other, and thus, the fusing portions are less likely to be thermally affected by each other and more easily exhibit desired fusing properties.

Advantageous Effects of Invention

As described above, the bending formation of the fuse element is facilitated according to the fuse of the invention of the present application and the method for manufacturing the fuse.

BRIEF DESCRIPTION OF THE DRAWINGS

Preferred and alternative examples of the present invention are described in detail below with reference to the following drawings.

REFERENCE SIGNS LIST

Figure 1A:
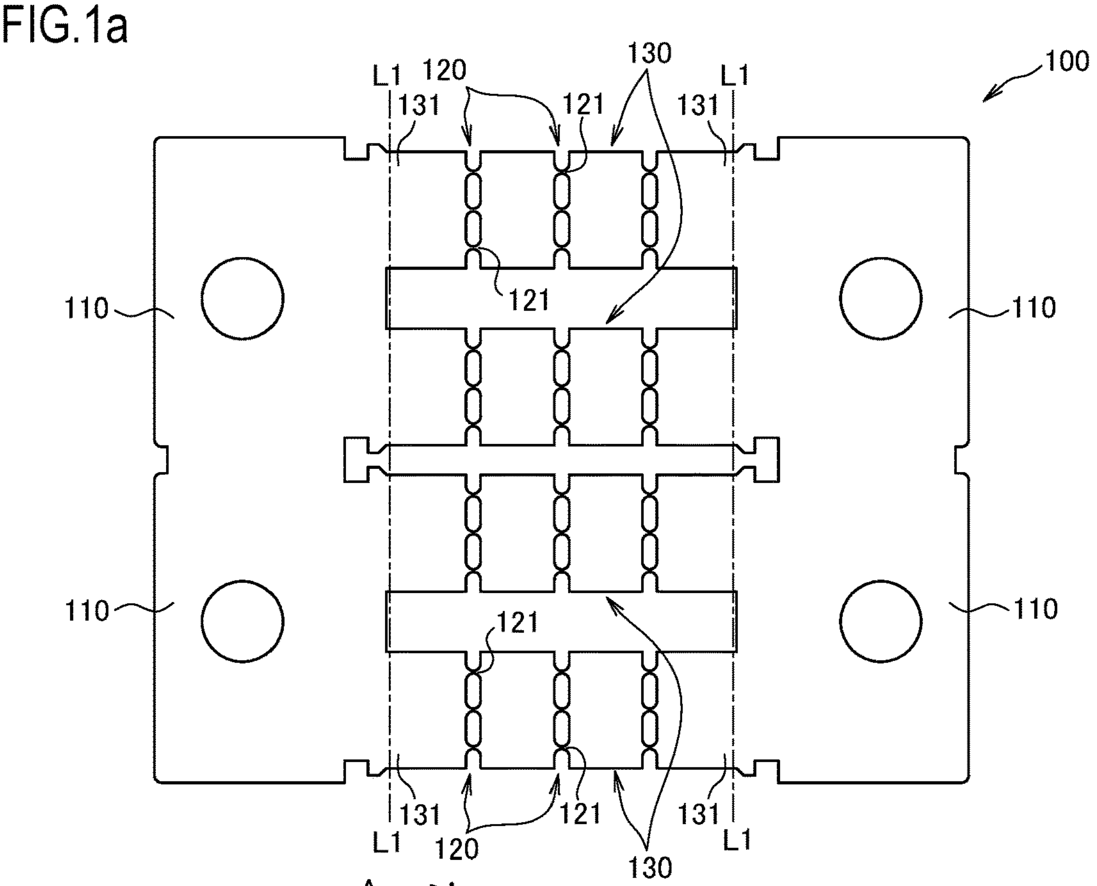
In FIG. 1, (a) is a plan view of a fuse element of a fuse according to the invention of the present application in a developed state, and (b) is a plan view of the fuse element in a state where a middle portion has been bent.

100 fuse element
110 terminal portion
120 fusing portion
130 middle portion
132 long side
133 center
400 fuse
K2 bending point

DETAILED DESCRIPTION OF THE PREFERRED EMBODIMENT

Hereinafter, an embodiment of the invention of the present application will be described with reference to the drawings. Note that a shape, a material, and the like of each member of a fuse according to the embodiment described hereinafter are merely examples, and are not limited thereto.

Figure 1B:
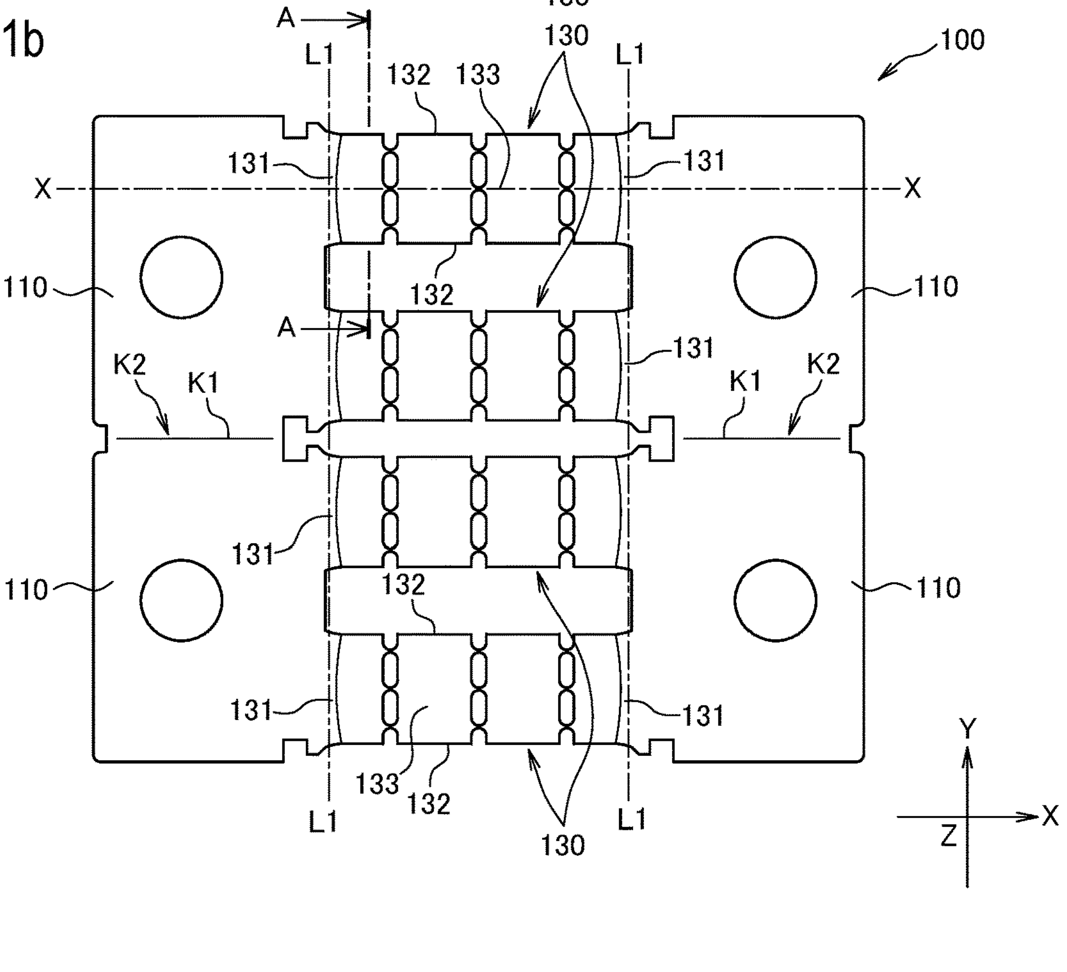
Figure 2A:
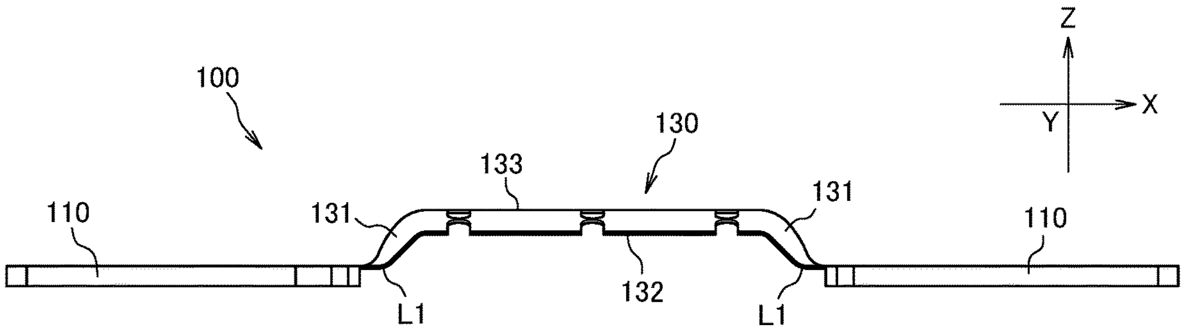
In FIG. 2, (a) is a side view of the fuse element in the state where the middle portion has been bent, (b) is a front view of the fuse element in the state where the middle portion has been bent, the front view illustrating the vicinity of the middle portion in an enlarged manner, and (c) is a cross-sectional view taken along line A-A illustrated in FIG. 1(*b*).
Figure 2B:
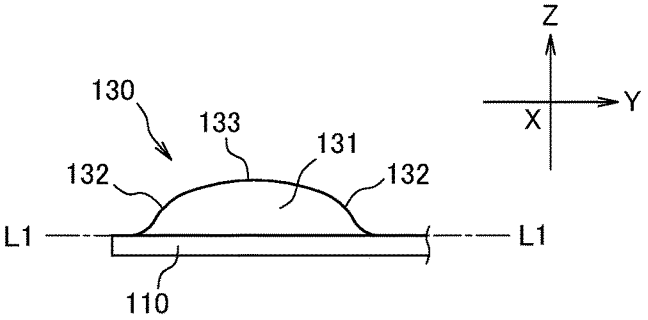
Figure 2C:
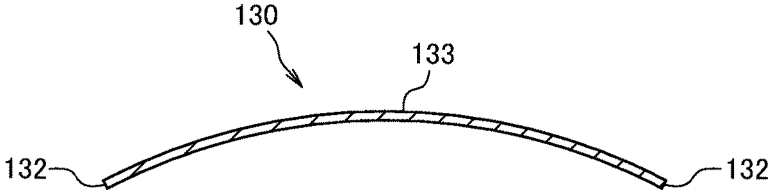
Figure 3A:
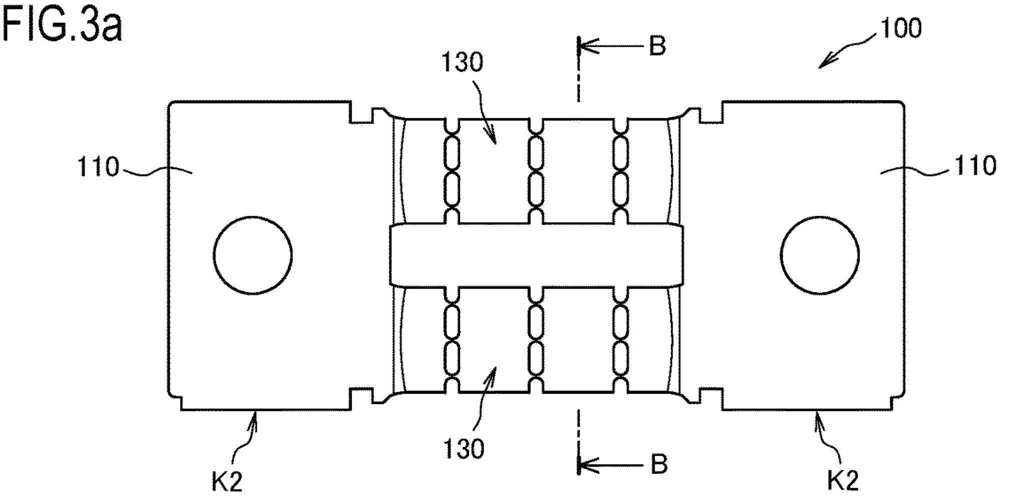
In FIG. 3, (a) is a plan view of a completed fuse element, (b) is an overall perspective view of the completed fuse element, (c) is a side view of the completed fuse element, and (d) is a cross-sectional view taken along line B-B.
Figure 3B:
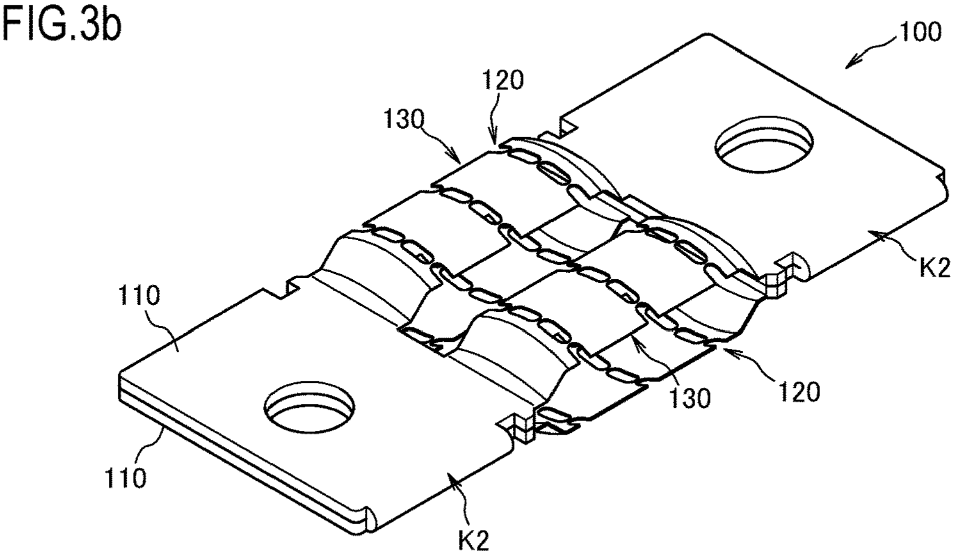
Figure 3C:
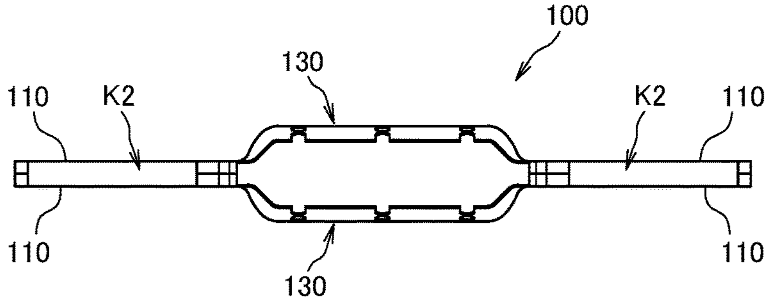
Figure 3D:
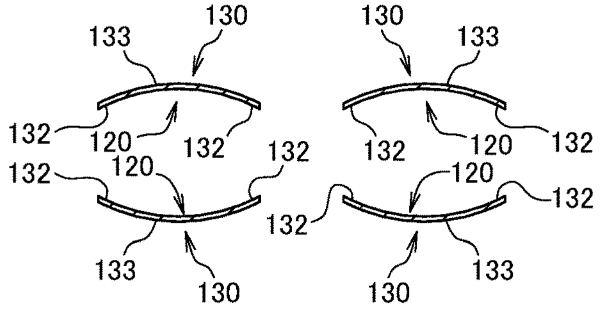

In FIGS. 1 to 3, a manufacturing process of a fuse element 100 of a fuse according to the invention of the present application will be described. Note that FIG. 1(*a*) is a plan view of the fuse element 100 in a developed state; FIG. 1(*b*) is a plan view of the fuse element 100 in a state where a middle portion 130 is bent; FIG. 2(*a*) is a side view of the fuse element 100 in a state where the middle portion 130 is bent; FIG. 2(*b*) is a front view of the fuse element 100 in a state where the middle portion 130 is bent, the front view illustrating the vicinity of the middle portion 130 in an enlarged manner; FIG. 2(*c*) is a cross-sectional view taken along line A-A illustrated in FIG. 1(*b*); FIG. 3(*a*) is a plan view of the completed fuse element 100; FIG. 3(*b*) is an overall perspective view of the completed fuse element 100; FIG. 3(*c*) is a side view of the completed fuse element 100; and FIG. 3(*d*) is a cross-sectional view taken along line B-B.

First, a flat plate material made of conductive metal such as copper or an alloy thereof is punched into a shape as illustrated in FIG. 1(*a*) by a pressing machine or the like. In a single metal plate formed into a predetermined shape as illustrated in FIG. 1(*a*), terminal portions 110 at both ends, flat middle portions 130 between the terminal portions 110, and a plurality of fusing portions 120 are formed in the middle portion 130. More specifically, the fusing portion 120 is constituted by a plurality of linear fusing points 121 whose widths are locally narrowed by providing small holes in the middle portion 130. When an unintended overcurrent flows in an electric circuit or the like, each of the fusing points 121 generates heat and fuses to cut off the overcurrent. Note that the fusing portion 120 is not limited to being constituted by the linear fusing points 121 having narrow widths, and can adopt any configuration, such as local arrangement of a metal material which is likely to be fused in the middle portion 130, if the overcurrent can be cut off by heat generation and fusing when the unintended overcurrent flows in the electric circuit or the like.

Next, as illustrated in FIGS. 1(*b*) and 2, a connection part 131 between the middle portion 130 and the terminal portion 110 is folded upward at a bending line L1 toward a Z direction which is a longitudinal direction orthogonal to an X direction which is a long direction of the middle portion 130. Then, the middle portion 130 is connected so as to slightly swell upward from the terminal portion 110. The bending line L1 extends in a Y direction as a short direction of the middle portion 130 orthogonal to the X direction and the Z direction. Note that this process of folding the connection part 131 is manually performed by a person or automatically performed by a bending machine.

As illustrated in FIGS. 1(*b*) and 2, the middle portion 130 is bent such that a center side 133 protrudes in the Z direction from long sides 132 on both sides along the X direction which is the long direction of the middle portion 130. Note that the middle portion 130 has a shape in which the center side 133 is curved so as to smoothly swell in the Z direction from the long sides 132 on both the sides, but may have a shape in which the center side 133 may is pointed like a substantially triangular shape as long as the center side 133 is bent in the Z direction more than the long sides 132 on both sides without being limited thereto. In addition, the process of bending the center side 133 of the middle portion 130 is manually performed by a person or automatically performed by a bending machine. Note that the process of folding the connection part 131 and the process of bending the center side 133 of the middle portion 130 may be simultaneously performed by the bending machine. Alternatively, the process of folding the connection part 131 may be performed first, and then, the process of bending the center side 133 of the middle portion 130 may be performed. Alternatively, the process of bending the center side 133 of the middle portion 130 may be performed first, and then, the process of bending the connection part 131 may be performed.

Next, when the laterally arranged terminal portions 110 are folded so as to vertically overlap each other at a bending line K1 at a bending point K2 approximately at the center of the terminal portion 110, the fuse element 100 is formed in a three-dimensional shape as illustrated in FIG. 3. Further, the bending line K1 is substantially parallel to the X direction which is the long direction of the middle portion 130, and the fuse element 100 has a line-symmetrical shape at the bending line K1. Therefore, when the upper and lower terminal portions 110 are folded at the bending point K2 as illustrated in FIG. 3, the middle portions 130 are disposed so as to face each other vertically. Note that this process of folding the terminal portion 110 is manually performed by a person or automatically performed by a bending machine, and the one terminal portion 110 is bent at the bending point K2 so as to be folded back toward the other adjacent terminal portion 110.

Here, since the middle portion 130 is long, the strength in the long direction is weak. In addition, since the middle portion 130 includes the fusing portion 120, the strength in the long direction is weak. Therefore, the middle portion 130 is bent such that the center side 133 protrudes from the long sides 132 on both the sides along the X direction which is the long direction in the invention of the present application, and thus, the strength of the middle portion 130 in the long direction is increased. Therefore, when the terminal portion 110 is folded to bend and form the fuse element 100, the middle portion 130 can be prevented from being bent and deformed. That is, the fuse element 100 of the fuse according to the invention of the present application has a structure in which the middle portion 130 is bent along the X direction which is the long direction so as to have the center side 133 protruding from the long sides 132 on both the sides, thereby facilitating the bending formation of the fuse element 100. Further, according to a method for manufacturing the fuse of the invention of the present application, a process of bending the middle portion 130 along the X direction which is the long direction such that the center side 133 protrudes from the long sides 132 on both the sides is provided, thereby facilitating the bending formation of the fuse element 100. Furthermore, since the middle portion 130 can be prevented from being deformed at the time of bending formation of the fuse element 100, it is possible to increase a processing speed of the fuse element 100 to improve the manufacturing efficiency of the fuse.

The fuse element 100 illustrated in FIGS. 1 to 3 includes a total of four middle portions 130 but may include any number of middle portions 130 as long as two or more middle portions 130 are provided without being limited thereto. Further, in the fuse element 100 illustrated in FIGS. 1 to 3, all the middle portions 130 are bent such that the center side 133 protrudes from the long sides 132 on both the sides, but the present invention is not limited thereto. When at least one or more middle portions 130 are bent such that the center side 133 protrudes from the long sides 132 on both the sides, not only the strength of the bent middle portion 130 is improved but also the entire strength including the vicinity of the connecting point between the middle portion 130 with the improved strength and the terminal portion 110 is improved. Thus, the middle portion 130 and the periphery thereof can be prevented from being bent and deformed at the time of bending formation of the fuse element 100, so that the bending formation of the fuse element 100 becomes easy.

Furthermore, according to the method for manufacturing the fuse of the invention of the present application, each of the middle portions 130 is bent along the X direction which is the long direction of the middle portion 130 such that the center side 133 protrudes in the Z direction from the long sides 132 on both the sides in a developed state before the fuse element 100 is folded at the bending point K2 of the terminal portion 110 as illustrated in FIGS. 1 and 2. That is, the middle portions 130 to be disposed so as to face each other are bent so as to protrude in the same direction. Therefore, when the terminal portions 110 are folded such that the terminal portions 110 overlap at the bending point K2 of the terminal portion as illustrated in FIG. 3(*d*), the middle portions 130 facing each other in the longitudinal direction are bent so as to be separated from each other outward. Then, the fusing portions 120 of the middle portions 130 facing each other can be separated from each other, and thus, the fusing portions 120 are less likely to be thermally affected by each other and more easily exhibit desired fusing properties.

Next, according to the method for manufacturing the fuse of the invention of the present application, each of the connection parts 131 between the middle portion 130 and the terminal portion 110 is folded upward at the bending line L1 toward the Z direction which is the longitudinal direction orthogonal to the X direction which is the long direction of the middle portion 130 in the developed state before the fuse element 100 is folded at the bending point K2 of the terminal portion 110 as illustrated in FIGS. 1 and 2. That is, the connection parts 131 of the middle portions 130 to be disposed so as to face each other are folded in the same Z direction. Therefore, when the terminal portions 110 are folded such that the terminal portions 110 overlap at the bending point K2 of the terminal portion as illustrated in FIG. 3(*c*), the middle portions 130 facing each other in the longitudinal direction are separated from each other outward. Then, the fusing portions 120 of the middle portions 130 facing each other can be separated from each other, and thus, the fusing portions 120 are less likely to be thermally affected by each other and more easily exhibit desired fusing properties.

Further, the middle portion 130 illustrated in FIG. 2(*b*) is bent such that the center side 133 protrudes to the outside of the connection part 131 more than the long sides 132 on both the sides, but the middle portion 130 may be bent such that the center side 133 protrudes to the inside of the connection part 131 more than the long sides 132 on both the sides without being limited thereto. However, the middle portion 130 is bent such that the center side 133 protrudes to the outside of the connection part 131 more than the long sides 132 on both the sides so that bending directions of the center side 133, the long sides 132, and the connection part 131 are smoothly continued in the same direction as illustrated in FIG. 2(*b*). Thus, a locally thinned part is not generated in such a bent part, and the strength is not locally weakened. As a result, the entire strength including the connection part 131 between the middle portion 130 and the terminal portion 110 is improved. Thus, the middle portion 130 and the periphery thereof can be prevented from being bent and deformed at the time of bending formation of the fuse element 100, so that the bending formation of the fuse element 100 becomes easy.

Note that the fuse element 100 is formed by punching the flat plate material made of conductive metal, such as copper or an alloy thereof, into the shape as illustrated in FIG. 1(*a*) with the pressing machine or the like. This plate material includes a single plate material in which only a plate thickness of the middle portion 130 including the fusing portion 120 is thin and a plate thickness of the terminal portion 110 is large, that is, the thickness is not uniform and a single plater material (profile) in which only a plate thickness of a part forming the fusing portion 120 is thinner than a plate thickness of the other part (the terminal portion 110 and the like). Therefore, it is unnecessary to separately prepare the fusing portion 120 made of a plate material having a small plate thickness and the terminal portion 110 made of a plate material having a large plate thickness and weld the both to each other, and the fuse element 100 can be easily manufactured.

Furthermore, the middle portion 130 made of the plate material having a small plate thickness is easily bent and deformed at the time of bending formation of the fuse element 100, but the strength of the middle portion 130 can be improved according to the invention of the present application. Thus, the middle portion 130 and the periphery thereof can be effectively prevented from being bent and deformed, and the bending formation of the fuse element 100 becomes easy. Note that the fuse element 100 is made of the material (profile) in which only the thickness of the part constituting the middle portion 130 including the fusing portion 120 is thinner than the thickness of the other part (the terminal portion 110 and the like), but may be made of a plate material in which a plate thickness of the part forming the middle portion 130 including the fusing portion 120 is the same as a plate thickness of the other part (the terminal portion 110 and the like), that is, the thickness is uniform without being limited thereto.

Figure 4A:
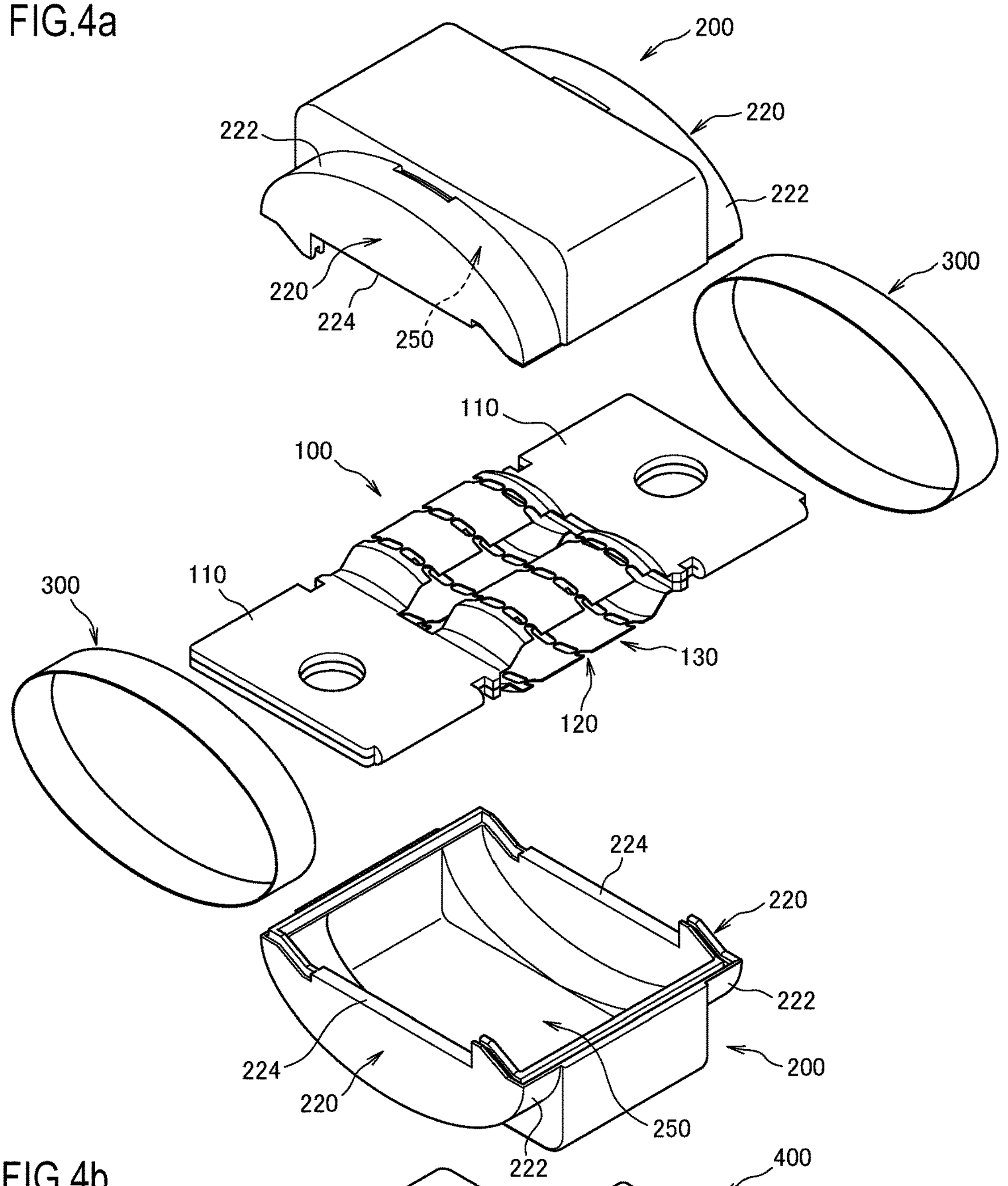
In FIG. 4, (a) is an overall perspective view illustrating members constituting the fuse according to the invention of the present application in an exploded manner, and (b) is an overall perspective view of a completed fuse.
Figure 4B:
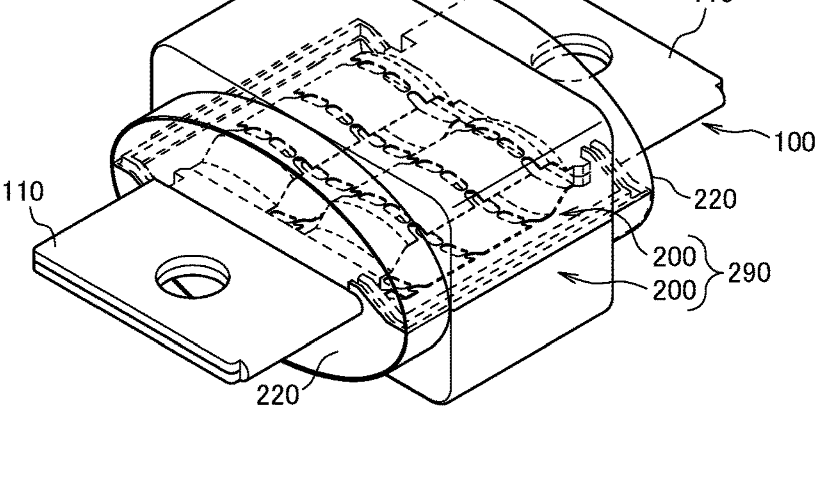

Next, a method for assembling the fuse 400 of the invention of the present application will be described with reference to FIG. 4. FIG. 4(*a*) is an overall perspective view illustrating members constituting the fuse 400 in an exploded manner, and FIG. 4(*b*) is an overall perspective view of the completed fuse 400.

As illustrated in FIG. 4(*a*), first, a casing-divided piece 200 made of synthetic resin is disposed with an opening 250 facing upward. Further, the terminal portions 110 of the fuse element 100 are placed on placement surfaces 224 of side walls 220 on both sides of the casing-divided piece 200. The middle portion 130 of the fuse element 100 is accommodated in the opening 250 of the casing-divided piece 200. Next, the casing-divided piece 200 having the same shape as the lower casing-divided piece 200 is fitted from above the lower casing-divided piece 200 with the opening 250 facing downward. Specifically, the placement surface 224 of the side wall 220 of the upper casing-divided piece 200 is applied toward the terminal portion 110, and the terminal portion 110 of the fuse element 100 is vertically sandwiched between the placement surface 224 of the upper casing-divided piece 200 and the placement surface 224 of the lower casing-divided piece 200.

Next, a frame-shaped fixing member 300 is attached to a casing 290 so as to surround the periphery of the terminal portion 110 from both sides in order to firmly fix the casing 290 constituted by the upper and lower casing-divided pieces 200 so as not to be detached. Specifically, the frame-shaped fixing member 300 is inserted through the terminal portion 110, and then, press-fitted into an outer surface 222 of the casing 290. The outer surfaces 222 of the upper and lower casing-divided pieces 200 are configured to continuously make a round over the periphery of the casing-divided pieces 200 when the upper and lower casing-divided pieces 200 are assembled. Therefore, the upper and lower casing-divided pieces 200 are firmly fixed to each other by press-fitting the frame-shaped fixing member 300 along the upper and lower outer surfaces 222. Note that the frame-shaped fixing member 300 is an annular body made of metal, and has the same shape so as to correspond to the outer surfaces 222 of the casing 290. In addition, the frame-shaped fixing member 300 is slightly smaller than the outer surfaces 222 such that the frame-shaped fixing member 300 can be press-fitted into the outer surfaces 222.

In this manner, the fuse element 100 and the casing 290 are assembled in a state where the fusing portion 120 of the fuse element 100 is accommodated inside, whereby the fuse 400 is completed as illustrated in FIG. 4(*b*). Further, the terminal portion 110 of the fuse element 100 protrudes outward from the side wall 220 of the casing 290 so as to be electrically connected to an external electric circuit. When an overcurrent flows through the external electric circuit, the fusing portion 120 accommodated in the casing 290 fuses to cut off the overcurrent, thereby protecting the electric circuit.

Note that the casing 290 includes the two upper and lower casing-divided pieces 200 having a substantially cubic shape, but the casing 290 may have any configuration as long as the fuse element 100 can be assembled in a state where the fusing portion 120 is accommodated inside without being limited thereto.

Note that the fuse and the method for manufacturing the fuse of the invention of the present application are not limited to the above embodiment, and various modifications and combinations can be made within the scope of the claims and the scope of the embodiment, and these modifications and combinations are also included in the scope of the right.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A fuse comprising a fuse element having a pair of terminal portions, at least two or more middle portions provided between the pair of terminal portions, and a fusing portion provided in the middle portion, wherein the at least two or more middle portions are provided in the pair of terminal portions as an integral part of the pair of terminal portions, the at least two or more middle portions are bent along a long direction such that a center side protrudes from long sides on both sides to an outside of a connection part of the at least two or more middle portions and the pair of terminal portions, wherein a center side of the connection part is curved towards an outside against a long-direction side part, wherein a curving direction of the at least two or more middle portions and a curving direction of the connection part is continuous in a same direction, and the at least two or more middle portions are disposed to face each other when the pair of terminal portions are folded at a bending point of the pair of terminal portions.

2. The fuse according to claim 1, wherein the at least two or more middle portions facing each other are bent so as to be separated from each other outward.

3. The fuse according to claim 2, wherein the connection part between the at least two or more middle portions and the pair of terminal portion is folded in a direction orthogonal to the long direction of the at least two or more middle portions such that the at least two or more middle portions facing each other are separated from each other outward.

4. The fuse according to claim 1, wherein the connection part between the at least two or more middle portions and the pair of terminal portions is folded in a direction orthogonal to the long direction of the at least two or more middle portions such that the at least two or more middle portions facing each other are separated from each other outward.

5. A method for manufacturing a fuse including a fuse element having a pair of terminal portions, at least two or more middle portions provided between the pair of terminal portions, and a fusing portion provided in the at least two or more middle portions, the method comprising:

punching a single metal plate to form the pair of terminal portions and the at least two or more middle portions between the pair of terminal portions;

bending the at least two or more middle portions along a long direction such that a center side protrudes from long sides on both sides to an outside of a connection part of the middle portions and the pair of terminal portions;

wherein a center side of the connection part is curved towards an outside against a long-direction side part, wherein a curving direction of the at least two or more middle portions and a curving direction of the connection part is continuous in a same direction, and folding the pair of terminal portions at a bending point of the pair of terminal portions to dispose the at least two or more middle portions so as to face each other.

6. The method for manufacturing a fuse according to claim 5, wherein the at least two or more middle portions facing each other are bent so as to be separated from each other outward.

7. The method for manufacturing a fuse according to claim 6, wherein the connection part between the at least two or more middle portions and the pair of terminal portions is folded in a direction orthogonal to the long direction of the at least two or more middle portions such that the at least two or more middle portions facing each other are separated from each other outward.

8. The method for manufacturing a fuse according to claim 5, wherein the connection part between the at least two or more middle portions and the pair of terminal portions is folded in a direction orthogonal to the long direction of the at least two or more middle portions such that the at least two or more middle portions facing each other are separated from each other outward.

* * * * *